(12) United States Patent
Chaugule et al.

(10) Patent No.: US 9,888,515 B2
(45) Date of Patent: Feb. 6, 2018

(54) DEVICE, SYSTEM AND METHOD FOR SYNCHRONIZING NETWORK STATES DURING HANDOVER BETWEEN VOLTE AND WIFI

(71) Applicant: APPLE INC., Cupertino, CA (US)

(72) Inventors: Raj Chaugule, Santa Clara, CA (US); Sanjay Verma, San Jose, CA (US); Xuqiang Hua, San Jose, CA (US); Anish Goyal, Milpitas, CA (US); Deepankar Bhattacharjee, Milpitas, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/148,419

(22) Filed: May 6, 2016

(65) Prior Publication Data
US 2017/0325273 A1 Nov. 9, 2017

(51) Int. Cl.
| | |
|---|---|
| *H04W 4/00* | (2009.01) |
| *H04W 76/02* | (2009.01) |
| *H04W 76/04* | (2009.01) |
| *H04L 29/06* | (2006.01) |
| *H04W 56/00* | (2009.01) |
| *H04W 88/06* | (2009.01) |

(52) U.S. Cl.
CPC ....... *H04W 76/025* (2013.01); *H04L 63/0478* (2013.01); *H04L 63/0485* (2013.01); *H04L 65/1006* (2013.01); *H04L 65/1016* (2013.01); *H04W 56/001* (2013.01); *H04W 76/046* (2013.01); *H04W 88/06* (2013.01)

(58) Field of Classification Search
CPC ............ H04W 76/025; H04W 76/046; H04W 56/001; H04W 88/06; H04L 63/0478; H04L 63/0485; H04L 65/1006; H04L 65/1016
See application file for complete search history.

(56) References Cited

U.S. PATENT DOCUMENTS

| | | | |
|---|---|---|---|
| 2012/0093086 A1* | 4/2012 | Yin ....................... | H04W 76/02 370/328 |
| 2013/0010751 A1* | 1/2013 | Rydnell ............ | H04W 36/0022 370/331 |
| 2013/0010752 A1* | 1/2013 | Rydnell ............ | H04W 36/0011 370/331 |

(Continued)

*Primary Examiner* — Clemence Han
(74) *Attorney, Agent, or Firm* — Fay Kaplun & Marcin, LLP

(57) ABSTRACT

A device, system, and method synchronizes network states for a user equipment (UE) during a handover from a first network to a second network while the UE was in a radio resource control (RRC) idle state. The method includes determining whether a first context associated with a first non-default bearer over the first network is stored on the UE. The method includes when the first context is determined, determining a second context associated with a second non-default bearer over the second network is stored on the UE. The method includes transmitting a request to the first network over a default bearer for network state information relative to the first network. The method includes receiving the network state information from the first network, the network state information indicating that the UE does not have the first non-default bearer over the first network established. The method includes deleting the first context.

20 Claims, 4 Drawing Sheets

(56) References Cited

U.S. PATENT DOCUMENTS

| | | | |
|---|---|---|---|
| 2013/0107863 A1* | 5/2013 | Faccin | H04W 36/0022 370/331 |
| 2016/0192245 A1* | 6/2016 | He | H04W 36/0033 370/331 |
| 2016/0219644 A1* | 7/2016 | Zhao | H04W 76/028 |

* cited by examiner

DEVICE, SYSTEM AND METHOD FOR SYNCHRONIZING NETWORK STATES DURING HANDOVER BETWEEN VOLTE AND WIFI

BACKGROUND INFORMATION

A user equipment (UE) may be configured to establish a connection to at least one of a plurality of different networks or types of networks to perform a variety of different functionalities via the network connection. For example, the UE may communicate with another UE through the network connection. Specifically, the communication may be a Voice over Internet Protocol (IP) (VoIP) call. Accordingly, the UE may register with an IP Multimedia Subsystem (IMS) for the VoIP functionality to be performed.

The VoIP call may be performed over different types of networks. For example, when performed over a Long Term Evolution (LTE) network, the VoIP call is referred to as a VoLTE call. In another example, the VoIP call may be performed over a WiFi network that is configured to utilize IP. Thus, when utilizing the LTE network, the UE may register with the IMS core network over an IMS bearer to be established over LTE. Similarly, when utilizing the WiFi network, the UE may register with the IMS core network over an IPSec tunnel to an IMS core established over WiFi. When the IMS bearer is established, the UE and the network associate this IMS bearer with a packet data protocol (PDP) context in case of both LTE and WiFi. Specifically, when the IMS bearer over the LTE network or over WiFi is established and information corresponding thereto is provided to the UE, the UE may store a context associated therewith relating to a respective network state of the UE. Thus, when utilizing services via IMS, the PDP context provides a pipe to the core IMS core network for IMS session initiation protocol (SIP) signalling. This PDP context is created at UE boot up and remains activated until deactivated. While a PDP context is up and activated, the UE will not attempt to bring up the PDP context again.

The UE may be a mobile device capable of moving from one location to another. This may enable the UE to roam from a first network using a first connection to a second network using a second connection. For example, the UE may roam from a LTE network to a WiFi network. With respect to the IMS bearer, the networks may perform a variety of different operations such as establishing the IMS bearer over the network to which the UE has roamed (e.g., the WiFi network) while releasing the IMS bearer over the network from which the UE has roamed (e.g., the LTE network).

When the UE is in a radio resource control (RRC) connected state, the UE may be provided information about the IMS bearers such that the UE is synchronized with all associated networks by updating the respective network states of the UE in each of these associated networks. For example, the UE may receive information that the WiFi network has established the IMS bearer over the WiFi network for the UE and store a corresponding context while the LTE network has released the IMS bearer for the UE such that the UE may delete the context for the IMS bearer over the LTE network. However, when the UE is in a RRC idle state, and the UE has roamed from the LTE network to the WiFi network while in the RRC idle state, and the UE has subsequently established the IMS bearer over the WiFi network, the UE only receives information about the IMS bearer over the WiFi network being established. That is, the UE still has the context for the IMS bearer over the LTE network despite the LTE network having released the IMS bearer for the UE due to the roam. Therefore, the UE only updates the WiFi network state of the UE but not the LTE network state. Accordingly, the UE is not synchronized with all associated networks regarding bearer information. This may cause a variety of issues, especially when the UE roams back to the LTE network while in a RRC idle state relative to the LTE network. For example, a VoIP call may be dropped since the UE performs operations based upon out-of-date information that the IMS bearer over the LTE network is still valid.

SUMMARY

The exemplary embodiments describe a method performed by a user equipment (UE) that has established a first connection with a first network and has roamed to establish a second connection with a second network while the UE is in a radio resource control (RRC) idle state condition with the first network. The method including determining whether a first context associated with a first non-default bearer over the first network is stored on the UE. When the first context is determined, determining a second context associated with a second non-default bearer over the second network is stored on the UE, transmitting a request to the first network over a default bearer for network state information relative to the first network, receiving the network state information from the first network, the network state information indicating that the UE does not have the first non-default bearer over the first network established; and deleting the first context.

The exemplary embodiments also describe a user equipment having a transceiver configured to establish a first connection with a first network to exchange first data with the first network and to establish a second connection with a second network to exchange second data with the second network and a processor connected to the transceiver configured to perform a roam from the first network to the second network while the UE is in a radio resource control (RRC) idle state, determine whether a first context associated with a first non-default bearer over the first network is stored on the UE and when the first context is determined, determine a second context associated with a second non-default bearer over the second network is stored on the UE, wherein the transceiver is configured to transmit a request to the first network over a default bearer for network state information relative to the first network, wherein the transceiver is configured to receive the network state information from the first network, the network state information indicating that the UE does not have the first non-default bearer over the first network established, and wherein the processor is configured to delete the first context.

The exemplary embodiments further describe a method for determining whether a first context associated with a first non-default bearer over a first network is stored on a user equipment (UE), determining a second context associated with a second non-default bearer over a second network is stored on the UE; transmitting a request to the first network over a default bearer for network state information relative to the first network, receiving the network state information from the first network, the network state information indicating that the UE does not have the first non-default bearer over the first network established; and deleting the first context.

DETAILED DESCRIPTION

Figure 1:
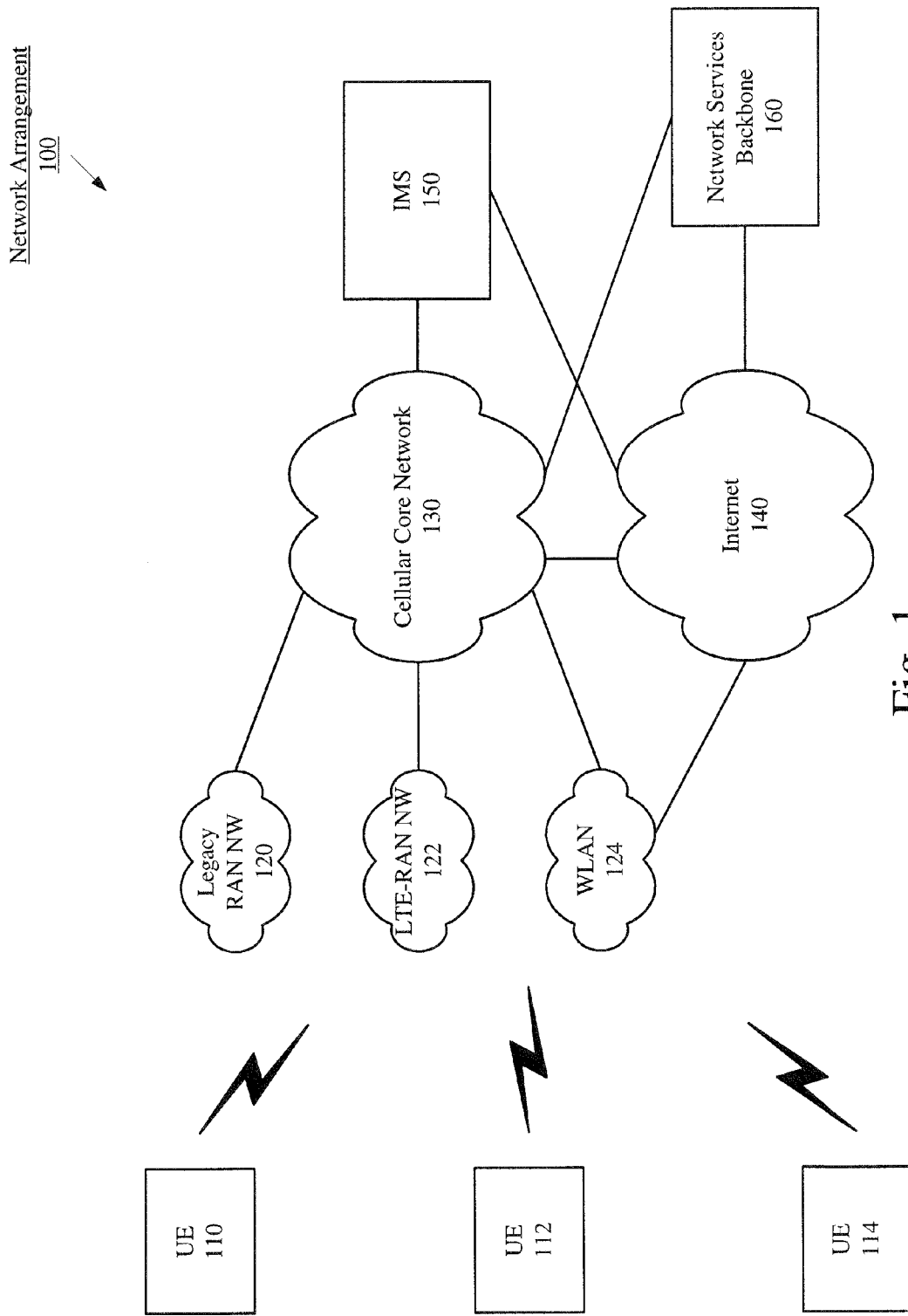
FIG. 1 shows a network arrangement according to various embodiments described herein.

The exemplary embodiments may be further understood with reference to the following description and the related appended drawings, wherein like elements are provided with the same reference numerals. The exemplary embodiments are related to a device, system, and method for synchronizing network states of a user equipment (UE) with networks to which the UE has established a connection. Specifically, the UE may have established a connection to a first network in which a non-default bearer is established. While the UE is in a radio resource control (RRC) idle state, the UE may roam to establish a connection to a second network in which a non-default bearer is established. To synchronize the network states of the UE, the exemplary embodiments provide a mechanism in which the UE performs a synchronization operation when the UE roams in the RRC idle state.

Initially, it is noted that the exemplary embodiments are described with regard to the UE roaming from a first network to a second network where the first network is a Long Term Evolution (LTE) network and the second network is WiFi network. However, the roam from the LTE network to the WiFi network is only exemplary. In other exemplary embodiments, the roam may be in an opposite direction (i.e., from the WiFi network to the LTE network), from a different type of network (e.g., HotSpot), to a different type of network (e.g., a legacy network), etc. Thus, any use of a roam from a first network to a second network may be representative of a change in a type of network in which a network state of the UE may change (whether the UE is provided corresponding information or not).

It is also noted that the exemplary embodiments are described with regard to operations associated with an Internet Protocol (IP) Multimedia Subsystem (IMS). Those skilled in the art will understand that upon connecting to a network, the UE may register with the IMS and may have an IMS bearer established for the UE to utilize the IMS through the connected network. Further connections to further networks may also entail registering with the IMS and establishing a respective IMS bearer for the UE to utilize the IMS through the respective further network. Thus, the exemplary embodiments are described with regard to the network state of the UE corresponding to the IMS bearer. However, the IMS bearer is only exemplary. In other exemplary embodiments, the network state may relate to other types of parameters, components, configurations, settings, etc. For example, the network state may include other types of bearers that are not default bearers. Thus, any use of the IMS bearer may be representative of any network state item in which synchronization is to be performed between the network and the UE.

It is further noted that the exemplary embodiments are described with a set of conditions that are determined for the mechanism according to the exemplary embodiments to be performed. However, the set of conditions described herein are only exemplary and the set of conditions may include further criteria or omit certain criteria as used herein. Thus, the set of conditions described herein are only exemplary and those skilled in the art will understand that other conditions or sets of conditions may be utilized when a substantially similar mechanism according to the exemplary embodiments would provide the features described herein.

FIG. 1 shows a network arrangement 100 according to various embodiments described herein. The exemplary network arrangement 100 includes UEs 110-114. In this example, it is assumed that a respective, different user is using each of the UEs 100-114. For example, a first user may be utilizing the UE 110, a second user may be utilizing the UE 112, and a third user may be utilizing the UE 114. Those skilled in the art will understand that the UEs 110-114 may be any type of electronic component that is configured to communicate via a network, e.g., mobile phones, tablet computers, desktop computers, smartphones, phablets, embedded devices, wearables, etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes. However, as will be understood from the description herein, the exemplary embodiments may relate to when at least one of the UEs 110-114 is present in the network arrangement 100 to utilize services associated with an IMS.

Each of the UEs 110-114 may be configured to communicate with one or more networks. In this example, the networks with which the UEs 110-114 may communicate are a legacy radio access network (RAN) 120, a LTE RAN (LTE-RAN) 122, and a wireless local area network (WLAN) 124. Each of the networks 120-124 is a wireless network with which the UEs 110-114 may communicate wirelessly. However, it should be understood that the UEs 110-114 may also communicate with other types of networks using a wired connection. With regards to the exemplary embodiments, the UEs 110-114 may establish a connection with the LTE-RAN 122 to utilize services associated with the IMS. For example, the UEs 110-114 may have a LTE chipset to communicate with the LTE-RAN 122. Again, the use of three (3) networks is only exemplary and there may be any other number of networks with which the UEs 110-114 may communicate.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base stations (Node Bs, eNodeBs (eNB), HeNBs, etc.) that are configured to send and receive traffic from UEs that are equipped with the appropriate cellular chip set. Examples of the legacy RAN 120 may include those networks that are generally labeled as 2G and/or 3G networks and may include circuit switched voice calls and packet switched data operations. Those skilled in the art will understand that the cellular providers may also deploy other types of networks, including further evolutions of the cellular standards, within their cellular networks. The WLAN 124 may include any type of wireless local area network (WiFi, Hot Spot, IEEE 802.11x networks, etc.). Those skilled in the art will understand that there may be thousands, hundreds of thousands or more of different WLANs deployed in the United States alone. For example, the WLAN 124 may be the user's home network, the user's work network, a public network (e.g., at a city park, coffee shop, etc.). Generally, the WLAN 124 will include one or more access points that allow the UEs 110-114 to communicate with the WLAN 124. However, as noted above, the exemplary embodiments relate to the UEs 110-114 utilizing the LTE-RAN 122 to perform VoLTE calls.

In addition to the networks 120-124, the network arrangement 100 also includes a cellular core network 130 and the Internet 140. The cellular core network 130, the legacy RAN 120, and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc. The cellular core network 130 also manages the traffic that flows between the cellular network and the Internet 140.

The network arrangement 100 also includes an IMS 150. The IMS 150 may be generally described as an architecture for delivering multimedia services to the UEs 110-114 using the IP protocol (e.g., a VoIP call). The IMS 150 may include a variety of components to accomplish this task. For example, a typical IMS 150 includes a Home Subscriber Server (HSS) that stores subscription information for a user of the UEs 110-114. Thus, when the corresponding UE of the user registers with the IMS 150 (e.g., connects thereto) via the connection established with one of the networks 120-124, the subscription information may be utilized to determine various features. For example, this subscription information is used to provide the correct multimedia services to the user such as a VoIP call. The IMS 150 may communicate with the cellular core network 130 and the Internet 140 to provide the multimedia services to the UEs 110-114. The IMS 150 is shown in close proximity to the cellular core network 130 because the cellular provider typically implements the functionality of the IMS 150. However, it is not necessary for this to be the case such as when the IMS 150 is provided by another party.

The connection to the IMS 150 may be performed through an initial association with an access point of the networks 120-124. For example, the UE 110 may associate with an eNB of the LTE-RAN 122. A subsequent connection may be established to the IMS 150 through various components of the IMS 150.

Specifically, an attach procedure may be performed in connecting the UE 110 to the IMS 150. For example, the IMS 150 may include a mobility management entity (MME) and a packet data network (PDN) gateway (PGW). These components may be responsible for at least one operation when the VoIP call functionality is used. Specifically, the MME may be a control-node for the LTE-RAN 122 that performs paging and tagging operations for an idle mode of the UE 110. More specifically, the MME may perform operations related to bearer activation and/or deactivation. The MME may also select a serving gateway (SGW) at the initial attach with the IMS 150. The SGW may be configured to route and forward data packets for the UE 110. For example, the SGW may manage and store contexts for the UE 110 such as parameters of the bearer service, network internal routing information, etc. The MME may also authenticate the UE 110 (via the HSS) such that the services available to the UE 110 are identified including the VoLTE call functionality. The PGW may be configured to provide a connectivity between the UE 110 to an external PDN by being a point of entry/exit for data packet traffic for the UE 110. It is noted that the IMS 150 may provide a connection to a plurality of PGW to access a corresponding number of PDN. Thus, the UE 110 may be enabled to exchange data packets with multiple PDNs via the PGW of the IMS 150.

During the attach procedure, the UE 110 may attach when a default access point name (APN) is an IMS APN and the IMS PDN is established during the default bearer determination. However, if the default APN is not the IMS APN, the IMD PDN may be established following the attach procedure. A further component associated with the IMS 150 may be an evolved packet data gateway (ePDG) that secures transmission of data with the UE 110 connected to an evolved packet core (EPC) of the LTE-RAN 122 when performed over an untrusted non-3GPP access channel. Accordingly, for IP security (IPSec) tunnels established for the UE, the ePDG may act as a termination node of IPsec tunnel.

The network arrangement 100 may also include a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

The network services backbone 160 may be provided by any entity or a set of entities. In one example, the network services backbone 160 is provided by the supplier of one or more of the UEs 110-114. In another example, the network services backbone 160 is provided by the cellular network provider. In still a further example, the network services backbone 160 is provided by a third party unrelated to the cellular network provider or the supplier of the UEs 110-114.

The exemplary embodiments relate to the UE 110 establishing a first connection to a first network such as the LTE-RAN 122 while subsequently establishing a first IMS bearer over the LTE connection with a corresponding first context being stored and subsequently roaming to establish a second connection to a second network such as the WLAN 124 while subsequently establishing a second IMS bearer over the WLAN connection with a corresponding second context being stored. Given the above scenario, the exemplary embodiments provide a mechanism by which the UE 110 is able to synchronize respective network states with the first and second networks, with particular regard to the first network from which the UE 110 has roamed. The mechanism relates to when the UE 110 is in a RRC idle state when the roam is performed.

Those skilled in the art will understand that when the UE 110 is in a RRC connected state, the UE 110 may be exchanging data with the connected network. Specifically, while the UE 110 is connected to the LTE-RAN 122 and in the RRC connected state (e.g., performing an operation that requires exchange of data with the LTE-RAN 122 such as a communication functionality), the UE 110 may receive information associated with the connection that the UE 110 has established with the LTE-RAN 122 from the access point thereof (e.g., an eNB). When the operation also involves a service provided by the IMS 150 (e.g., a VoIP call), the UE 110 may also receive further information associated with the connection that the UE 110 has established with the LTE-RAN 122 as well as the IMS 150 via operations performed on a network side. For example, the UE 110 may request that an IMS bearer over the LTE-RAN 122 be established for the service to be used. A bearer may generally define how data is treated when transmitted through the network. For example, the bearer may be a set of network parameters that define data specific treatment by type or association with an application. Accordingly, the network may treat a first type of data in a first manner and treat a second type of data in a second manner. For example, the first type of data may be prioritized so that the network treats this data in a special manner. It should be noted that the bearer may also define the treatment based upon user identity or other identification parameters. The network side operations may include the LTE-RAN 122 and the IMS 150 exchanging information for the IMS bearer to be established for the UE 110. When the IMS bearer has been established through the network side operations, the LTE-RAN 122 may provide information of the establishment to the UE 110. The UE 110 may accordingly store a context for the IMS bearer. A substantially similar set of operations may be performed when the UE 110 is connected to the WLAN 124 where a further IMS bearer is established for the UE 110 over the WLAN connection and a further context is stored for this further IMS bearer.

It is noted that there may be a variety of other types of bearers that may be established. For example, an initial type of bearer may be a default bearer. When the UE 110 associates and establishes a connection with the LTE-RAN 122, one or more default bearers may be established for the UE 110. The LTE-RAN 122 via the associated eNB to which the UE 110 is connected may assign the default bearer, which remains so long as the UE is connected to the LTE-RAN 122. The default bearer may be a best effort service for the data transmitted through the LTE-RAN 122. Thus, depending upon various network conditions currently being experienced by the LTE-RAN 122, the data being transmitted through the default bearer may be given whatever resources are available.

The IMS bearer may be a further type of bearer that may be established between the UE 110 and the LTE-RAN 122. Thus, the IMS bearer may provide a tunnel in which data is transmitted between the UE 110 and the IMS 150 (via further network connectivity components). A still further type of bearer may be a dedicated bearer. The dedicated bearer may provide a dedicated tunnel for specific traffic. For example, the dedicated bearer may be established for a specified use (e.g., for an application). When the use has concluded, the dedicated bearer may be released by the network and the UE 110 may be notified of the release such that any context that is stored for the dedicated bearer may be deleted by the UE 110. As noted above, the IMS bearer may be representative of any type of bearer. Accordingly, in another exemplary embodiment, the exemplary embodiments may also be modified for use with dedicated bearers. Also noted above, the association of the mechanism according to the exemplary embodiments with the IMS 150 is also representative of any type of network component to which the synchronization is to be performed. Accordingly, in another exemplary embodiment, the exemplary embodiments may be modified for use with a further network component to which the bearer is established.

Those skilled in the art will understand that the network side operations do not necessarily correlate to UE side operations. Although efforts are made so that the network state of the UE 110 is synchronized with actual conditions of the network, there may be instances in which the network state of the UE 110 is in an out of sync state. In an exemplary scenario, the exemplary embodiments may be utilized to synchronize the network state of the UE 110 when the UE 110 is connected to the LTE-RAN 122 and stores a context for an IMS bearer that was established over the LTE-RAN 122. The UE 110 may be in an RRC idle state and roam to the WLAN 124. A specific scenario where the synchronization of the network state may result in an issue or problem may be when the UE 110 has utilized a service of the IMS 150 such that an IMS bearer has been established over the WLAN 124. If the UE 110 roams back to the LTE-RAN 122, the issue results from the UE 110 still having the context for the IMS bearer over the LTE-RAN 122 although the network side operations has released the IMS bearer over the LTE-RAN 122 for the UE 110.

When the UE 110 is in a RRC connected state, all establishing and releasing information for any bearer may be provided to the UE 110, particularly when a roam is being performed. Thus, the UE 110 may have its network state synchronized with the network from which the UE 110 roamed and the network to which the UE 110 has roamed. For example, the network may utilize explicit non-stratum access (NAS) signaling to delete contexts for the UE 110 when the corresponding IMS bearer has been released. However, when the UE 110 is in an RRC idle state and roams, a communication channel may be used for the UE 110 to perform an IMS re-registration from the network from which the UE 110 roamed to the network to which the UE 110 has roamed. For example, when the UE 110 roams from the LTE-RAN 122 to the WLAN 124, an IPSec Tunnel may be brought up to perform the IMS re-registration on WiFi transport. The 3GPP specification indicates that the network does not delete the IMS PDN on the LTE-RAN 122 towards the MME because the UE 110 was in the RRC idle state. Specifically, 3GPP Specification 23.401 §5.4.4.1 states that the network should not delete the packet data protocol (PDP) context when the UE 110 is in the RRC idle state. However, the 3GPP specification also indicates that the network deletes the PDP context when the IPSec tunnel is brought up (e.g., when the IMS re-registration is performed due to the roam). Specifically, 3GPP Specification 23.402 § 8.6.2.1 provides such a setting.

Although the LTE IMS PDP context associated with the IMS bearer for the UE 110 over the LTE-RAN 122 has been released on the network side, the LTE-RAN 122 never synchronized the network state of the UE 110 via explicit NAS signaling because the UE 110 was in the RRC idle state. Therefore, the network state of the UE 110 is out of sync with the LTE-RAN 122. That is, the UE 110 still has the context for the IMS bearer stored although the IMS bearer no longer exists. As noted above, this asynchronous network state may cause issues, particularly if the UE 110 is utilizing an IMS service and roams from the WLAN 124 back to the LTE-RAN 122. Specifically, the UE 110 may attempt to utilize the IMS bearer over the LTE-RAN 122 corresponding to the stored context. The UE 110 believes a request for the IMS bearer over the LTE-RAN 122 is unnecessary and does not perform this operation when the UE 110 roams back to the LTE-RAN 122. However, without the IMS bearer corresponding to the stored context existing, the IMS service being utilized during the roam may be prematurely and inadvertently terminated (e.g., a dropped VoIP call).

In light of the above scenario, the exemplary embodiments provide a mechanism in which the UE 110 is able to synchronize its network state to resolve any discrepancies. Utilizing allowed signaling as defined in the 3GPP specification, the mechanism according to the exemplary embodiments enables the UE 110 to signal the LTE-RAN 122 (or the network from which the UE 110 roamed) to determine bearer status information. With the IMS bearer over the LTE-RAN 122 not being included in the bearer status information, the UE 110 may update its network state by deleting the corresponding context. Those skilled in the art will appreciate that no changes to the network side operations are required to accommodate the mechanism according to the exemplary embodiments as the operations are performed by the UE 110.

Figure 2:
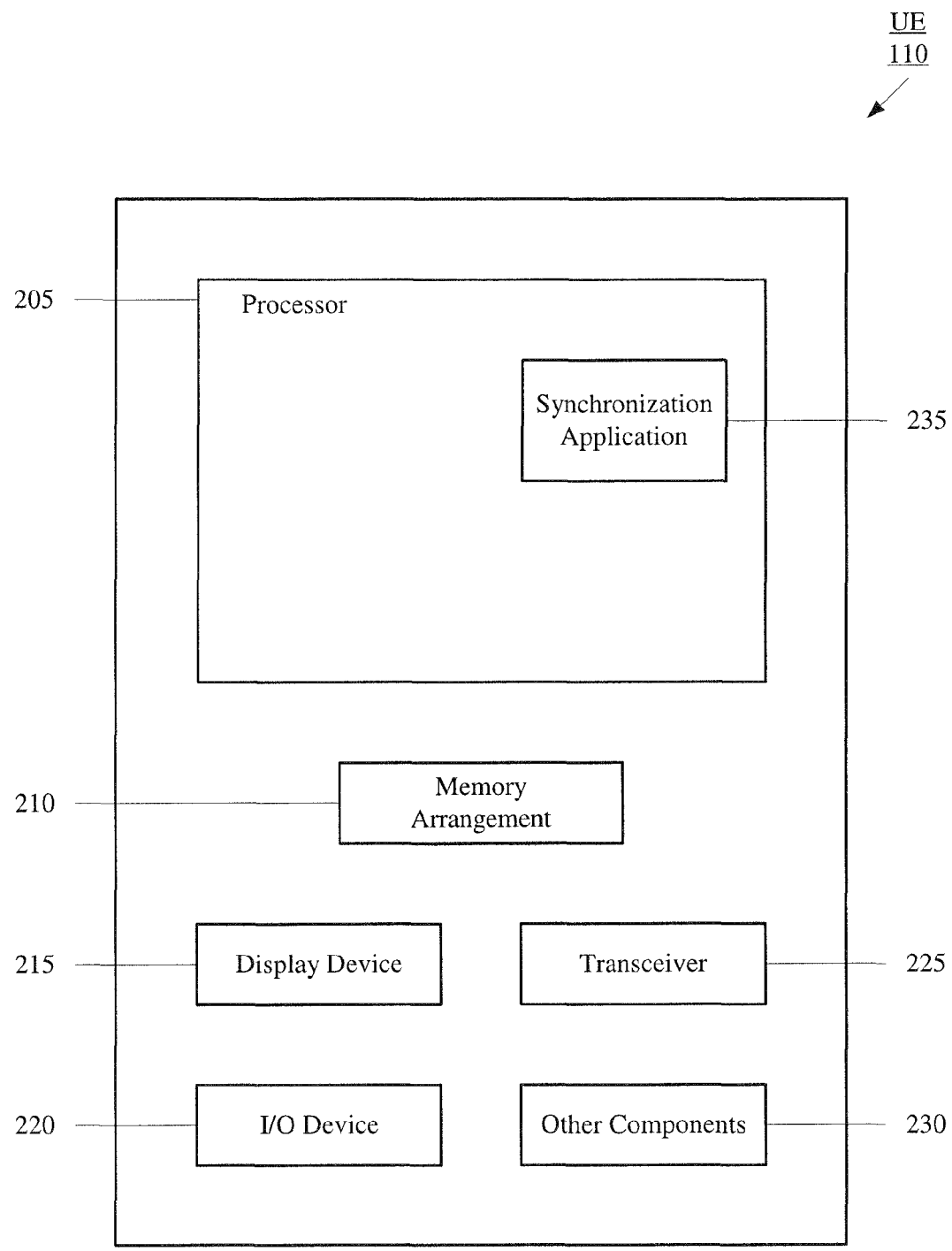
FIG. 2 shows a user equipment according to various embodiments described herein.

FIG. 2 shows the exemplary UE 110 according to various embodiments described herein. The UE 110 is configured to execute an application that performs the respective functionalities to synchronize the network state of the UE 110 with associated networks that the UE 110 has connected (e.g., previously connected, currently connected, etc.) according to the exemplary embodiments. The UE 110 may represent any electronic device that is configured to perform wireless functionalities. Specifically, the UE 110 may exchange signals and data with networks for the network state to be synchronized. The UE 110 may be a portable device that utilizes a wireless connection such as a smartphone, a tablet, a phablet, a laptop, a wearable, etc. In another example, the UE 110 may be a client stationary device such as a desktop terminal that utilizes a wireless connection. The UE 110 may include a processor 205, a memory arrangement 210, a display device 215, an input/output (I/O) device 220, a transceiver 225, and other components 230. The other components 230 may include, for example, an audio input device, an audio output device, a battery, a data acquisition device, ports to electrically connect the UE 110 to other electronic devices, etc.

The processor 205 may be configured to execute a plurality of applications of the UE 110. For example, the applications may include a web browser when connected to a communication network via the transceiver 225. As such, when connected to the LTE-RAN 122, the data for the web browser may utilize the default bearer. In another example, the processor 205 may execute an IMS service application. The IMS service application may include a plurality of different types of applications such as a communication application, a media content streaming application, etc. Thus, when the IMS service application is utilized, the IMS bearer with the IMS 150 may be established. In a further example, the processor 205 may execute a plurality of passive or background applications associated with network operations. Specifically, the processor 205 may execute baseband processor operations and/or applications processor operations. Those skilled in the art will understand that these operations may relate to the plurality of layers of the Open Systems Interconnection (OSI) model. In yet another example and according to the exemplary embodiments, the processor 205 may execute a synchronization application 235. As will be described in further detail below, the synchronization application 235 may perform an operation that causes the network state of the UE 110 to be synchronized with a network from which the UE 110 roamed.

It should be noted that the above noted applications each being an application (e.g., a program) executed by the processor 205 is only exemplary. The functionality associated with the applications may also be represented as a separate incorporated component of the UE 110 or may be a modular component coupled to the UE 110, e.g., an integrated circuit with or without firmware.

The memory 210 may be a hardware component configured to store data related to operations performed by the UE 110. Specifically, the memory 210 may store information associated with a network state of the UE 110 including contexts corresponding to IMS bearers that have been established over respective networks for the UE 110. The display device 215 may be a hardware component configured to show data to a user while the I/O device 220 may be a hardware component that enables the user to enter inputs. It should be noted that the display device 215 and the I/O device 220 may be separate components or integrated together such as a touchscreen.

The transceiver 225 may be a hardware component configured to transmit and/or receive data. That is, the transceiver 225 may enable communication with other electronic devices directly or indirectly through a network based upon an operating frequency of the network. The transceiver 225 may operate on a variety of different frequencies or channels (e.g., set of consecutive frequencies) that are related to IMS service applications. Thus, an antenna (not shown) coupled with the transceiver 225 may enable the transceiver 225 to operate on the various frequency bands.

As noted above, the processor 205 may execute the synchronization application 235 according to the exemplary embodiments. The synchronization application 235 may be configured to determine a plurality of predetermined settings or conditions that are present to trigger a further operation that synchronizes the network state of the UE 110. As described in detail above, one exemplary set of predetermined settings or conditions that the synchronization application 235 determines relates to when the UE 110 has roamed from the LTE-RAN 122 to the WLAN 124 while in a RRC idle state in which the UE 110 has also stored a context for an IMS bearer over the LTE-RAN 122 as well as a context for an IMS bearer over the WLAN 124.

Using the above example, the UE 110 roams by disconnecting from the LTE-RAN 122 and establishing a connection with the WLAN 124. Once connected to the WLAN 124, the UE 110 may register with the IMS 150. Thus, if required, an IMS bearer may be established for the UE 110 over the WLAN 124. The synchronization application 235 may determine this set of conditions that have occurred for the UE 110. Accordingly, the synchronization application 235 may be configured to perform its synchronization functionality. In a first operation, the synchronization application 235 may determine whether the IMS PDP with the LTE-RAN 122 is still active. That is, the synchronization application 235 may determine whether the context associated with the IMS bearer over the LTE-RAN 122 is still stored (e.g., in the memory 210). If still present, in a second operation, the synchronization application 235 may trigger an indication towards the baseband processor operations to trigger the baseband processor operations to perform a service request to the LTE-RAN 122. In a specific exemplary embodiment, the service request may be a genuine request transmitted to the LTE-RAN 122 but created using dummy data because there is currently no data associated with this connection. However, the use of dummy data is only exemplary and the synchronization application 235 may utilize any data for the service request to be generated for the remaining operations to be performed properly. By transmitting the service request to the LTE-RAN 122, the UE 110 is brought to a RRC connected state with the LTE-RAN 122. The service request may enable information regarding the network state of the UE 110 for the LTE-RAN 122 to be received by the UE 110.

When the LTE-RAN 122 receives the service request, the LTE-RAN 122 may configure the UE 110 with a default bearer which, as described above, may be used to exchange network data. Specifically, data having a Quality of Service (QoS) Class Identifier (QCI) value 9 used for Internet traffic only may be exchanged between the LTE-RAN 122 and the UE 110 over the default bearer. The LTE-RAN 122 may thereby provide information corresponding to the bearers that have been currently established for the UE 110. As noted above, the conditions and settings of the UE 110 may have resulted in the LTE-RAN 122 releasing the IMS bearer upon the roam being performed while the UE 110 is in the RRC idle state. However, the UE 110 may not have been made aware that the IMS bearer was released which resulted in the context corresponding to this IMS bearer remaining stored on the UE 110. Accordingly, through the above mechanism performed by the synchronization application 235 according to the exemplary embodiments, the UE 110 may receive network state information for the LTE-RAN 122, particularly regarding the bearers. Specifically, the default bearer having been established with the LTE-RAN 122 may be configured via RRC Reconfiguration messages. It is noted that the 3GPP Specification provides a provision for such an operation to be utilized. The 3GPP Specification 24.301 §5.6.1.4 provides such a provision. Thus, the baseband processor operations may include locally releasing any dangling PDN contexts for the IMS 150 and sending an indication to the applications processor operations regarding the deletion of the context. In this manner, the IMS PDP context on the LTE-RAN 122 for the UE 110 may become synchronized with the LTE-RAN 122.

Again using the above exemplary embodiment, the synchronization with the LTE-RAN 122 may result in any potential issues being eliminated. For example, the UE 110 may have established a connection with the LTE-RAN 122. For any of a variety of reasons, an IMS bearer over the LTE-RAN 122 may be established for the UE 110 and a context corresponding thereto may be stored on the UE 110. The UE 110 may roam from the LTE-RAN 122 to the WLAN 124 while the UE 110 is in the RRC idle state. As noted above, the IMS bearer over the LTE-RAN 122 may be released, but the context on the UE 110 remains. Subsequently, again for any of a variety of reasons, an IMS bearer over the WLAN 124 may be established for the UE 110 and a context corresponding thereto may be stored on the UE 110. A scenario may arise where an IMS service is being utilized through the IMS bearer over the WLAN 124 and the UE 110 is in a RRC idle state with the LTE-RAN 122. The UE 110 may again roam to return to the LTE-RAN 122. Using the mechanism of the synchronization application 235 according to the exemplary embodiments, the UE 110 is aware that the IMS bearer over the LTE-RAN 122 from its prior connection was released as the context corresponding thereto has been deleted. Thus, to seamlessly perform the roam while the IMS service continues to operate, the UE 110 may request that the IMS bearer over the LTE-RAN 122 be established again. Therefore, in contrast to conventional approaches, the IMS service continues to operate and does not terminate prematurely and inadvertently.

Figure 3:
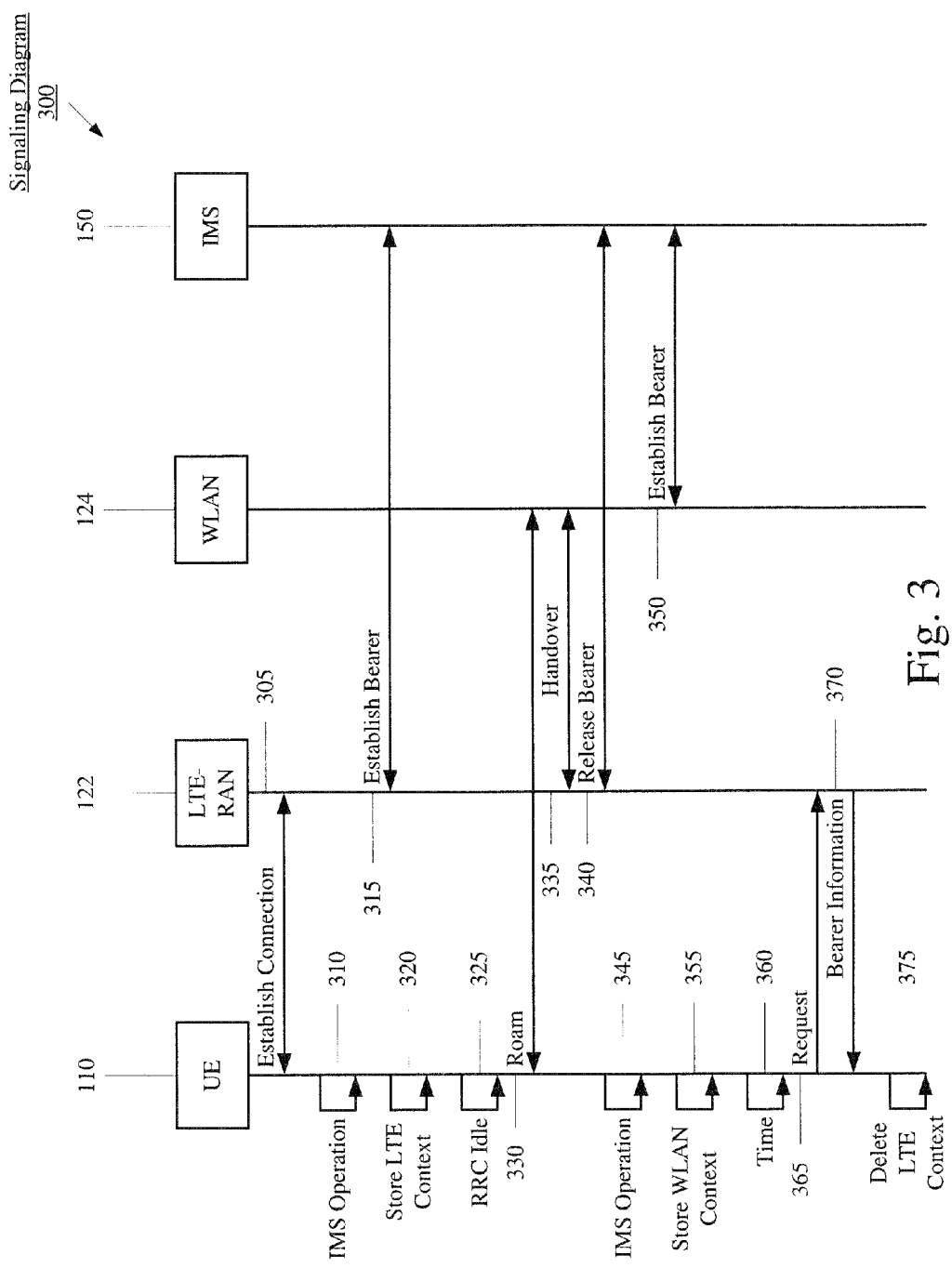
FIG. 3 shows a signaling diagram for a user equipment operation in synchronizing network information according to various embodiments described herein.

FIG. 3 shows a signaling diagram 300 for a UE operation in synchronizing network information according to various embodiments described herein. The signaling diagram 300 illustrates an exemplary process in which the synchronization application 235 is being used. The signaling diagram 300 also relates to the above described scenario in which the UE 110 roams from the LTE-RAN 122 to the WLAN 124 in the RRC idle state, had previously established an IMS bearer over the LTE-RAN 122, and has established an IMS bearer over the WLAN 124.

Initially, the UE 110 may establish a connection 305 with the LTE-RAN 122. For example, the UE 110 may be disposed in proximity to a LTE cellular tower providing coverage where the UE 110 is located. Using proper signal exchanges for an association process to be performed, the UE 110 may establish the connection 305 with the LTE-RAN 122. At some time subsequent to the UE 110 connecting to the LTE-RAN 122, an IMS service may be utilized. Accordingly, an IMS operation 310 may be performed using the UE 110. Since an IMS service is being utilized, the UE 110 may have transmitted a request for the IMS bearer to be established. The UE 110 may register with the IMS 150 and the LTE-RAN 122 may perform a set of known operations to establish the IMS bearer 315 with the IMS 150 over the LTE-RAN 122 for the UE 110. The LTE-RAN 122 may accordingly provide information to the UE 110 that the IMS bearer has been established over the LTE-RAN 122. The UE 110 may store the LTE context 320 corresponding to the IMS bearer 315 over the LTE-RAN 122.

When the IMS service has been concluded or otherwise results in the UE 110 entering the RRC idle state 325 for the LTE-RAN 122, the UE 110 may perform a roam 330 from the LTE-RAN 122 to the WLAN 124. A corresponding handover procedure 335 may be performed between the LTE-RAN 122 and the WLAN 124. In performing the roam, an IPSec Tunnel may be established for the data associated with the roam to be exchanged. In a network operation, the LTE-RAN 122 may release 340 the IMS bearer over the LTE-RAN 122 for the UE 110 as per the 3GPP Specification. However, the LTE-RAN 122 does not explicitly notify the UE 110 that the IMS bearer over the LTE-RAN 122 has been released. As the UE 110 roamed in the RRC idle state 325, the UE 110 continues to store the LTE context 320 for the IMS bearer over the LTE-RAN 122.

At some time subsequent to the UE 110 connecting to the WLAN 124, an IMS service may be utilized. Accordingly, an IMS operation 345 may be performed using the UE 110. Since an IMS service is being utilized, the UE 110 may have transmitted a request for the IMS bearer to be established. The UE 110 may register with the IMS 150 and the WLAN 124 may perform a set of known operations to establish the IMS bearer 350 with the IMS 150 over the WLAN 124 for the UE 110. The WLAN 124 may accordingly provide information to the UE 110 that the IMS bearer has been established over the WLAN 124. The UE 110 may store the WLAN context 355 corresponding to the IMS bearer 350 over the WLAN 124.

The synchronization application 235 may determine the above conditions, operations, and settings associated with the overall network state of the UE 110 including the roam in the RRC idle state and the establishment of the IMS bearers. The synchronization application 235 may perform functionalities to synchronize the network state of the UE 110. The synchronization application 235 may perform operations using a variety of different factors. In a first example, upon the determination of the conditions, the synchronization application 235 may immediately perform the synchronization functionality. In a second example, the synchronization application 235 may perform the synchronization functionality based upon a predetermined timer value. The predetermined time value may be relative to a variety of references. For example, the predetermined time value may be based upon the determination of the conditions. Accordingly, the predetermined time value may be a static value that is used. In another example, the predetermined time value may be based upon the IMS operation that is currently being performed that triggered the IMS bearer to be established over the WLAN 124. When related to the IMS operation, the predetermined time value may be a static value or may be a dynamic value that may decrease if the IMS operation is time sensitive.

As illustrated in the signaling diagram 300, the predetermined timer value may be utilized. Thus, after a time 360 has passed from the establishment of the IMS bearer 350 over the WLAN 124, the request 365 may be transmitted from the UE 110 via the transceiver 225 being utilized by the synchronization application 235 to the LTE-RAN 122 (e.g., an eNB thereof). By establishing a default bearer with the LTE-RAN 122, the UE 110 may receive bearer information 370 from the LTE-RAN 122. As noted above, the request 365 and the bearer information 370 may be embodied, for example, as RRC Reconfiguration messages. The UE 110 may be updated with the bearer information including that the LTE-RAN 122 had previously released the previous IMS bearer 315 over the LTE-RAN 122 to which the LTE context 320 was stored. Thus, the UE 110 may delete 375 the LTE context 320 to synchronize the network state of the UE 110 with the LTE-RAN 122.

It should again be noted that the conditions described above for the synchronization application 235 to perform its functionality is only exemplary. For example, the conditions may include a further condition. Specifically, the synchronization operation may only be triggered when the above conditions have been determined with a further determination that the UE 110 is roaming back to the network in which the determined context is associated. When this further condition is used, if the UE 110 is roaming to a different network in which there is no context stored, the synchronization operation may be skipped. In another example, the conditions may omit certain conditions. In a first example, the synchronization operation may be triggered whenever the UE 110 has roamed in the RRC idle state with a stored context. That is, a subsequent IMS operation on the roamed network may not be necessary for the synchronization operation to be performed. In a second example, the synchronization operation may be triggered upon determining that a context associated with a currently non-connected network is still stored. That is, a determination of a roam may not be included as a condition to perform the synchronization functionality.

It should also be noted that the use of the predetermined timer value is only exemplary. As noted above the synchronization application 235 may immediately perform the synchronization functionality without any use of a predetermined timer value. Thus, the synchronization functionality may be performed concurrently or serially from the IMS bearer over the WLAN 124 being established. However, the use of the timer value may allow an opportunity for the LTE-RAN 122 to delete the context for the UE that has roamed by transmitting a signal or message to the UE about the deleted context (which may be performed spontaneously such as during a synchronization procedure triggered due to other reasons including data availability). However, as this spontaneous operation may potentially never occur, the timer value may ensure that the network states of the UE are synchronized.

Figure 4:
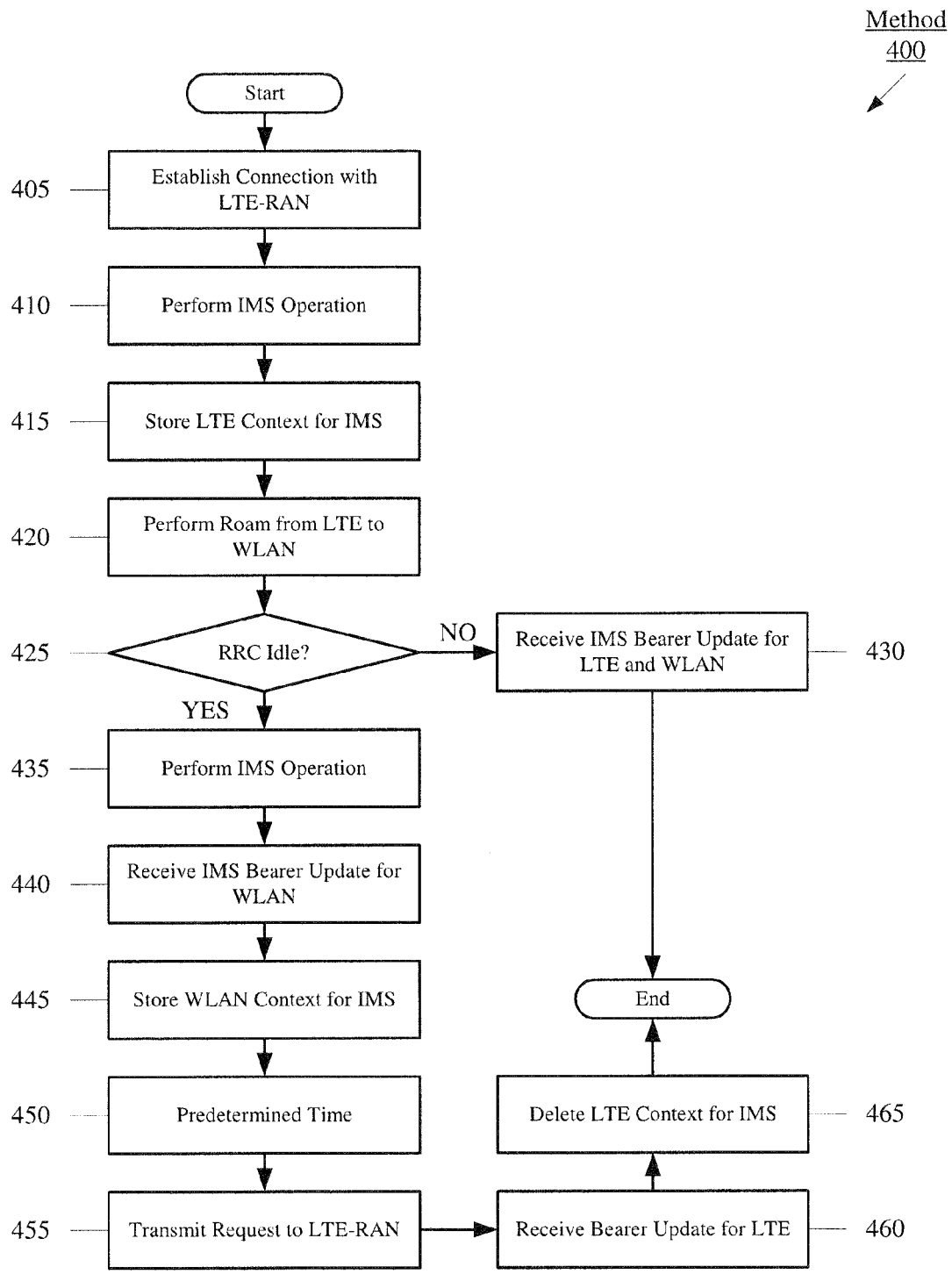
FIG. 4 shows a method for a user equipment operation in synchronizing network information according to various embodiments described herein.

FIG. 4 shows a method 400 for a UE operation in synchronizing network information according to various embodiments described herein. The method 400 relates to how the UE 110 determines a set of conditions that indicate that a synchronization functionality should be performed to prevent any potential issues that may occur due to a network state of the UE 110 being out of sync with the respective network. The method 400 will be described with reference to the UE 110 and the synchronization application 235. However, operations performed on a network side will also be described. The method 400 will also be described with regard to the network arrangement 100 of FIG. 1 and the UE 110 of FIG. 2.

In step 405, the UE 110 establishes a connection with the LTE-RAN 122. For example, a default bearer may be established for network data to be exchanged between the UE 110 and the LTE-RAN 122. It should again be noted that the use of the LTE-RAN 122 is only exemplary and any network in which a registration with the IMS 150 to which an IMS bearer may be established may also be used. As discussed above, the UE 110 may establish the connection with the LTE-RAN 122 through any association procedure.

In step 410, using the connection to the LTE-RAN 122, the UE 110 performs an IMS operation. As described above, the IMS operation may be any IMS service provided via the IMS 150. For example, the UE 110 may execute a communications functionality such as a VoIP call, a video call, etc. To perform this communication functionality, the IMS 150 may be utilized. In another example, the UE 110 may execute a cloud functionality or a streaming functionality in which the IMS 150 may be utilized. By performing the IMS operation, the UE 110 may request that an IMS bearer over the LTE-RAN 122 be established for use with the IMS operation. The LTE-RAN 122 may receive the request and exchange data with the IMS 150 to establish the IMS bearer over the LTE-RAN 122. When the LTE-RAN 122 has received acknowledgement that the IMS bearer over the LTE-RAN 122 has been established, the LTE-RAN 122 may transmit information corresponding to the IMS bearer over the LTE-RAN 122 to the UE 110. Thus, in step 415, the UE 110 stores the LTE context for the IMS bearer over the LTE-RAN 122. This may assume that the UE 110 has determined that no context is stored for the IMS bearer over the LTE-RAN 122.

In step 420, the UE 110 may perform a roam from the LTE-RAN 122 to the WLAN 124. For example, the UE 110 may move from a first location where the WLAN 124 is unavailable to a second location where the WLAN 124 is available. The UE 110 may also have a preference for the WLAN 124 over the LTE-RAN 122 for an automatic roam procedure to be performed. In another example, the UE 110 may manually join the WLAN 124 upon discovering the network. Thus, the roam procedure may entail the UE 110 and the WLAN 124 performing an association procedure and the LTE-RAN 122 and the WLAN 124 performing a handover procedure.

In step 425, the UE 110 determines whether the UE 110 is in a RRC idle state. As described above, the RRC state may indicate whether network state information is received when the roam is performed. Thus, if the RRC state is a RRC connected state such as the IMS operation continuing to be used or other radio operation which utilizes a data exchange with the LTE-RAN 122 and subsequently the WLAN 124 after the roam, the UE 110 continues the method 400 to step 430. However, if the RRC state is a RRC idle state such as no radio operation is being utilized, the UE 110 continues the method 400 to step 435.

In step 430, the UE 110 receives network information from the LTE-RAN 122 and the WLAN 124. Specifically, because of the RRC connected state, the 3GPP Specification defines protocols for the respective network to transmit the network information to the UE 110. For example, the LTE-RAN 122 may release the IMS bearer over the LTE-RAN 122 for the UE 110 as the IMS operation may continue to be used over a newly created IMS bearer over the WLAN 124 that is created for the UE 110 during the roam. Thus, the network information provided to the UE 110 may include the release of the IMS bearer over the LTE-RAN 122 and the establishing of the IMS bearer over the WLAN 124. The UE 110 may thereby delete the context for the IMS bearer over the LTE-RAN 122 while storing the context for the IMS bearer over the WLAN 124. As the UE 110 has received all information regarding the bearers, the UE 110 is synchronized with the networks.

Returning to step 435 where the UE 110 was in a RRC idle state during the roam, the UE 110 may perform a further IMS operation. The further IMS operation may entail the UE 110 re-registering with the IMS 150 and having an IMS bearer over the WLAN 124 to be established (for which a request may be transmitted to the WLAN 124). This may assume that the UE 110 has already determined that no context is stored for an IMS bearer over the WLAN 124 for the UE 110. Thus, a substantially similar operation may be performed on a network side to perform these operations. In step 440, the UE 110 receives bearer update information that the IMS bearer over the WLAN 124 has been established. In step 445, the UE 110 stores the WLAN context for the IMS bearer over the WLAN 124.

In step 450, the UE 110 determines whether the synchronization functionality performed by the synchronization application 235 has been activated. As described above, the synchronization functionality may be activated upon determining the above described conditions including the roam in the RRC idle state and the establishing of the IMS bearer over the roamed network. Also described above, the synchronization functionality may be activated based upon various criteria including a predetermined timer value. Thus, in step 450, the UE 110 determines whether the predetermined timer value has been reached.

When the predetermined timer value has been reached, in step 455, the UE 110 transmits a request for network information from the network from which the UE 110 had roamed. Specifically, the UE 110 transmits a request for network information from the LTE-RAN 122. Initially, the UE 110 may verify that the context is still stored for the IMS bearer over the LTE-RAN 122. If still stored, the UE 110 may transmit the request. Thus, a default bearer may be established and RRC Reconfiguration messages may be exchanged between the UE 110 and the LTE-RAN 122. In step 460, the UE 110 may receive the bearer information update from the LTE-RAN 122. If the bearer information update indicates that the default bearer for which the current set of messages are being exchanged is established with no IMS bearer over the LTE-RAN 122, the UE 110 may be aware that the context for the IMS bearer over the LTE-RAN 122 is out of date. Thus, in step 465, the UE 110 deletes the context for the IMS bearer over the LTE-RAN 122. In this manner, the UE 110 is synchronized with the LTE-RAN 122 regarding the IMS bearer.

The exemplary embodiments provide a device, system, and method of synchronizing a network state of a UE. The network state of the UE may be associated with a first network from which the UE roamed and a second network to which the UE has roamed. The UE may have stored a context corresponding to a non-default bearer over the first network. The UE may have also stored a context corresponding to a non-default bearer over the second network. If the roam from the first network to the second network occurred while the UE was in a RRC idle state, the UE may be asynchronous with the first network regarding the non-default bearer. Thus, the mechanism according to the exemplary embodiments provides an active mechanism in which the UE initiates a synchronization functionality to verify whether the network state of the UE relative to the first network is synchronized.

It is again noted that the above exemplary embodiments relate to operations associated with a roam from a LTE network to a WiFi network. However, this is only exemplary. The exemplary embodiments may also be performed for a roam in the opposite direction. The exemplary embodiments may also relate to any type of network in which any type of bearer information may become asynchronous between the network and the UE.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a user equipment (UE) that had established a first connection with a first network and has roamed to establish a second connection with a second network while the UE was in a radio resource control (RRC) idle state:
   determining whether a first context associated with a first non-default bearer over the first network is stored on the UE;
   when the first context is determined, determining a second context associated with a second non-default bearer over the second network is stored on the UE;
   transmitting a request to the first network over a default bearer for network state information relative to the first network;
   receiving the network state information from the first network, the network state information indicating that the UE does not have the first non-default bearer over the first network established; and
   deleting the first context.

2. The method of claim 1, wherein the first non-default bearer is a first Internet Protocol (IP) Multimedia Subsystem (IMS) bearer and the second non-default bearer is a second IMS bearer.

3. The method of claim 2, wherein the first context is stored on the UE when the first IMS bearer is established from performing a first IMS operation on the UE while connected to the first network, and wherein the second context is stored on the UE when the second IMS bearer is established from performing a second IMS operation on the UE while connected to the second network.

4. The method of claim 3, wherein the request is transmitted after a predetermined timer value after the determining the second context or based on a type of the second IMS operation.

5. The method of claim 3, further comprising:
   roaming from the second network to the first network; and
   transmitting a further request to establish the first non-default bearer over the first network.

6. The method of claim 1, wherein the request is transmitted upon the determining the second context.

7. The method of claim 1, wherein the UE roaming from the first network to the second network includes establishing an IP Secure (IPSec) tunnel.

8. The method of claim 1, wherein the first non-default bearer was released by the first network once the UE had roamed.

9. The method of claim 1, wherein the request and the network state information are included in RRC Reconfiguration messages.

10. The method of claim 1, wherein the first network is a Long Term Evolution (LTE) network and the second network is a WiFi network.

11. A user equipment, comprising:
a transceiver configured to establish a first connection with a first network to exchange first data with the first network and to establish a second connection with a second network to exchange second data with the second network; and
a processor connected to the transceiver configured to:
perform a roam from the first network to the second network while the UE is in a radio resource control (RRC) idle state;
determine whether a first context associated with a first non-default bearer over the first network is stored on the UE; and
when the first context is determined, determine a second context associated with a second non-default bearer over the second network is stored on the UE,
wherein the transceiver is configured to transmit a request to the first network over a default bearer for network state information relative to the first network,
wherein the transceiver is configured to receive the network state information from the first network, the network state information indicating that the UE does not have the first non-default bearer over the first network established, and
wherein the processor is configured to delete the first context.

12. The user equipment of claim 11, wherein the first non-default bearer is a first Internet Protocol (IP) Multimedia Subsystem (IMS) bearer and the second non-default bearer is a second IMS bearer.

13. The user equipment of claim 12, further comprising:
a memory arrangement storing the first context when the first IMS bearer is established from performing a first IMS operation on the UE while connected to the first network, the memory arrangement storing the second context when the second IMS bearer is established from performing a second IMS operation on the UE while connected to the second network.

14. The user equipment of claim 13, wherein the request is transmitted after a predetermined timer value after the determining the second context or based on a type of the second IMS operation.

15. The user equipment of claim 13, wherein the processor is further configured to:
roam from the second network to the first network; and
transmit a further request to establish the first non-default bearer over the first network.

16. The user equipment of claim 11, wherein the request is transmitted upon the determining the second context.

17. The user equipment of claim 11, wherein the UE roaming from the first network to the second network includes establishing an IP Secure (IPSec) tunnel.

18. The user equipment of claim 11, wherein the first non-default bearer was released by the first network once the UE had roamed.

19. The user equipment of claim 11, wherein the request and the network state information are included in RRC Reconfiguration messages.

20. A method, comprising:
determining whether a first context associated with a first non-default bearer over a first network is stored on a user equipment (UE);
determining a second context associated with a second non-default bearer over a second network is stored on the UE;
transmitting a request to the first network over a default bearer for network state information relative to the first network;
receiving the network state information from the first network, the network state information indicating that the UE does not have the first non-default bearer over the first network established; and
deleting the first context.

* * * * *